Aug. 27, 1929.  F. LEUTZ  1,725,807

AUTOMOBILE COMBINED SEAT AND BED STRUCTURE

Filed April 20, 1928

INVENTOR.
FERDINAND LEUTZ,
BY
ATTORNEY.

Patented Aug. 27, 1929.

1,725,807

UNITED STATES PATENT OFFICE.

FERDINAND LEUTZ, OF HEBRON, NORTH DAKOTA.

AUTOMOBILE COMBINED SEAT AND BED STRUCTURE.

Original application filed April 9, 1927, Serial No. 182,403. Divided and this application filed April 20, 1928. Serial No. 271,508.

My invention relates to an automobile combined seat and bed.

The present application is a division of my co-pending application for automobile combined seat and bed structure, filed April 9, 1927, Serial No. 182,403.

In accordance with my invention, one or both front seats of an automobile are adapted to have their backs swung rearwardly to a horizontal position, for use in conjunction with the rear seat, whereby a bed is produced. The back seat cushion is narrower than the frame supporting it, providing a space at the rear edge of the back seat cushion, and a head cushion is stored within this space and serves to prevent the back seat cushion from shifting rearwardly. The head cushion may be removed and the back seat cushion shifted rearwardly so that its supporting frame projects forwardly beyond the same, and serves as a support for the back of the front seat.

Figure 1:
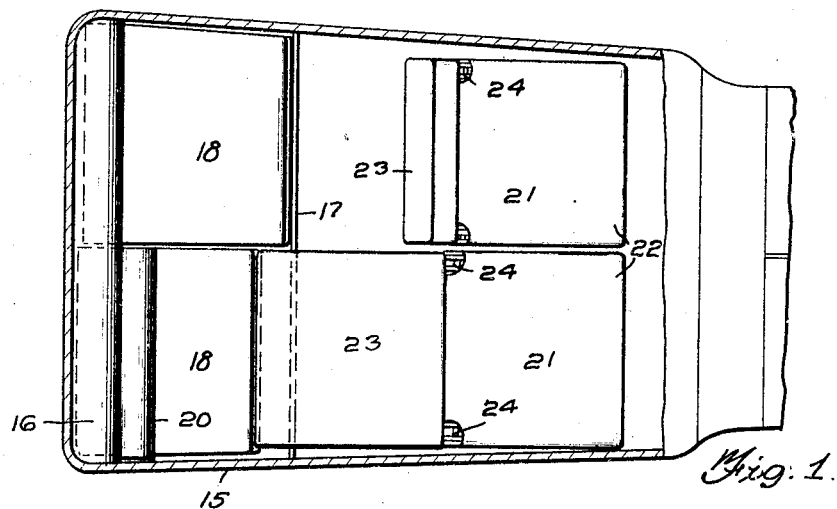
Figure 2:
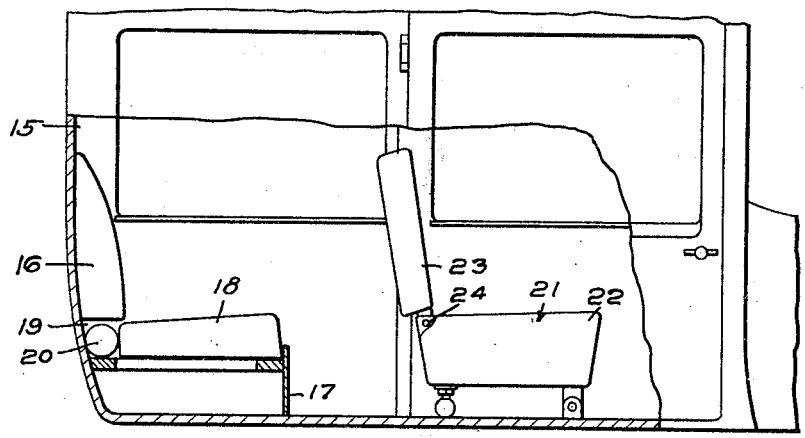
Figure 3:
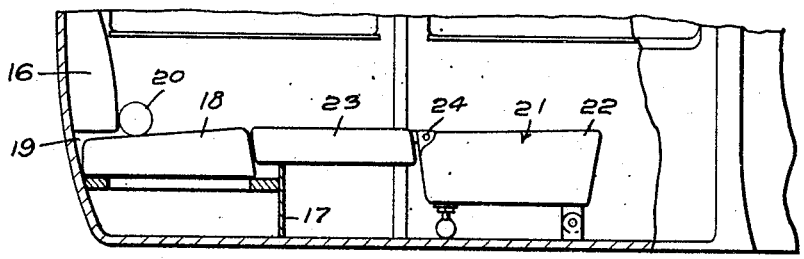

In the accompanying drawings, forming a part of this specification, and in which like numerals are employed to designate like parts throughout the same, Figure 1 is a plan view of a combined seat and bed structure embodying my invention, Figure 2 is a side elevation of the same, and, Figure 3 is a side elevation, showing the structure adjusted to produce a bed.

In the drawings, wherein for the purpose of illustration is shown a preferred embodiment of my invention, the numeral 15 designates the closed body of an automobile, which may be of the coach type. The back seat of the automobile embodies the usual back cushion 16. The numeral 17 designates a support or frame for the rear seat cushions 18, which are preferably independently adjustable. The rear seat cushions 18 have their rear edges adapted to be shifted rearwardly into a recess or space 19, beneath the back cushion 16, and between this back cushion and the support or frame 17. When the seat cushion 18 is shifted to the rearmost position, Figure 2, its forward edge is positioned rearwardly of the forward edge of the support 17, and when shifted to the forward position, its forward edge preferably projects forwardly beyond the forward edge of the support 17. The space 19 is adapted to receive and hold head cushions 20, which are preferably circular in cross section. When the head cushions 20 are arranged within the recess or space 19 they hold the seat cushions 18 against rearward movement. When the seat cushions 18 are in the rearmost position, the head cushions 20 are positioned upon the top of the seat cushions 18 and adjacent to the back cushion 16, as shown. Arranged in advance of the rear seat are front seats 21, one or both of which may be adapted to be swung forwardly, to a substantially vertical position, as is well known in the coach type of automobile. Each front seat embodies a seat cushion 22, and a back cushion 23. The back cushion 23 has a hinge connection with the seat cushion 22, as shown at 24. The back cushion is adapted to be swung forwardly to extend over the seat cushion 22. The back cushion may be locked in the upright position, or it may be swung rearwardly past the upright position to assume a horizontal position, Figure 2, with its rear end resting upon and overlapping the forward edge of the frame 18. The construction of the hinge connecting the back cushion 23 and seat cushion 22 is shown in detail in my co-pending application for automobile combined seat and bed structure, filed April 9, 1927, Serial No. 182,403, and it is thought to be unnecessary to show and describe the same in detail in the present case. While it is preferred to employ this form of hinge connection, other types of hinges may be employed, which are adapted to hold the back cushion 23 in the upright position, and are adjustable to permit the back cushion 23 being swung to the horizontal position.

I prefer to provide two separate rear seat cushions 23, as this would enable the use of either pair of co-acting front and rear seats to be used as a bed, without disturbing the remaining pair of front and rear seats.

In use, the head cushion 20 is removed from the space 19 and the rear seat cushion 18 is shifted rearwardly so that its rear edge fills the space 19, and the forward edge of the supporting frame 18 will then project forwardly beyond the rear seat cushion 18. The corresponding back cushion 23 is swung rearwardly to the horizontal position, and is of sufficient length to rest upon and overlap the forward edge of the support or frame 17, and be positioned in close relation to the forward edge of the rear seat cushion 18. The head cushion is arranged upon the rear seat cushion 18, as shown.

It is to be understood that the form of my invention, herewith shown and described, is to be taken as a preferred example of the same, and that various changes in the shape, size and arrangement of parts, may be resorted to without departing from the spirit of my invention, or the scope of the subjoined claim.

Having thus described my invention, I claim:—

A convertible automobile seat, comprising a back seat embodying a back cushion, a generally horizontal support arranged beneath and spaced from the lower end of the back cushion, whereby a space is afforded between the lower end of the back cushion and said support, a rear seat cushion slidably mounted upon the support and adapted to have its rear end shifted into said space between the rear back cushion, said rear seat cushion being of such a length with relation to said support that said support will extend forwardly beyond the rear seat cushion when said rear seat cushion is shifted to the rear position, the uncovered forward end of said support being then adapted to support the swinging back of a front seat and a head cushion adapted to be stored within said space when the back seat cushion is in the forward position and then serving to prevent the rearward movement of the back seat cushion.

In testimony whereof I affix my signature.

FERDINAND LEUTZ.